United States Patent

Settineri et al.

[15] 3,660,257
[45] May 2, 1972

[54] ELECTROLYTIC PROCESS FOR THE PREPARATION OF α-METHYLBENZYL DIMERS FROM SULFONIUM COMPOUNDS

[72] Inventors: William J. Settineri; Ritchie A. Wessling, both of Midland, Mich.

[73] Assignee: The Dow Chemical Company, Midland, Mich.

[22] Filed: Dec. 2, 1969

[21] Appl. No.: 881,574

[52] U.S. Cl. ............................................................204/72
[51] Int. Cl. ..................C07b 29/06, C07c 1/00, C07c 15/18
[58] Field of Search ..............................................204/72, 73

[56] References Cited

UNITED STATES PATENTS 3,480,527  11/1969  Wessling et al. ..........................204/73
3,480,525  11/1969  Wessling et al. ..........................204/59

Primary Examiner—F. C. Edmundson
Attorney—Griswold & Burdick and C. E. Rehberg

[57] ABSTRACT

α-Methylbenzyl dimers having the formula

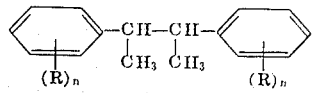

wherein $n$ is an integer from 0 to 5 and R is an inert substituent, are prepared by electrochemically reducing a sulfonium salt having the formula

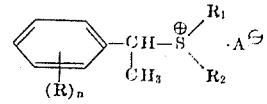

wherein $R_1$ and $R_2$ are alkyl or hydroxy-substituted alkyl groups and $A^-$ is an electrolytically acceptable anion. The reduction and coupling occur at a mercury cathode without the formation of organomercury compounds.

10 Claims, No Drawings

ELECTROLYTIC PROCESS FOR THE PREPARATION OF α-METHYLBENZYL DIMERS FROM SULFONIUM COMPOUNDS

BACKGROUND OF THE INVENTION

Polarography is an extremely useful analytical method of determining qualitatively and quantitatively the cations in a solution. The polarography of certain sulfonium compounds is described by Colichman and Love, J. Org. Chem., 18, 40 (1953).

The preparation of p,p'-dinitrobibenzyl by electrochemical reduction of p-nitrobenzyl sulfonium compounds, e.g., p-nitrobenzyldimethylsulfonium chloride is described in U.S. Pat. No. 3,480,527. The reduction and coupling reaction occurred using various cathodes and electrolysis solvents, e.g., a mercury cathode and an aqueous solution of the sulfonium salt. However, other benzyl sulfonium salts in an electrolyte solution reacted with a mercury cathode to form bisorganomercury compounds, as described in our copending application, Ser. No. 881,573 filed December 2, 1969 and entitled "Process for Producing Bisorganomercury Compounds by the Electroreduction of Sulfonium Compounds." E.g., the electrolysis of an aqueous solution of benzyl- or p-isoamyl-benzyldimethylsulfonium chloride using a mercury cathode produced in about 90 percent yield dibenzylmercury and bis(p-isoamylbenzyl)mercury, respectively.

The subject process, as well as the above processes, utilize sulfonium salts and an electrolysis system comprising an anode, a cathode, an electrolysis solvent and a means for applying and maintaining an electrical potential between said anode and cathode.

SUMMARY OF THE INVENTION

It has now been discovered that α-methylbenzyl dimers having the formula (I) 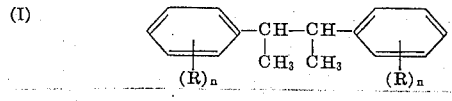

wherein $n$ is an integer of from 0 to 5 and R an inert, substantially non-interferring group, i.e., R is a group which is inert in the process and which does not sterically hinder or prevent the formation of the desired product (such stearic considerations being a factor when R is in the ortho ring positions) are produced in the novel process comprising subjecting an α-methylbenzyl sulfonium salt in an electrolysis solvent to an electrical potential sufficient to reduce the sulfonium salt; the sulfonium salt having the formula (II) 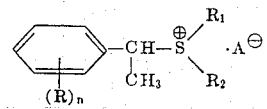

wherein $n$ and R have the above meaning and $R_1$ and $R_2$ are alkyl or hydroxy-substituted alkyl groups of from one to about 15 carbon atoms and $A^-$ is an electrolytically acceptable anion. The compounds thus produced are useful as lubricants, as additives in extreme pressure lubricant compositions, as surfactants when R is a polyhydroxyalkyl group, as reactants for making useful novolac and alkyd resins when R is hydroxy, hydroxyalkyl or hydroxyaryl, and other like uses which will be apparent to those skilled in the art.

The discovery that the electrolysis of α-methylbenzyl sulfonium salts, with or without stabilizing parasubstituents, produced the α-methylbenzyl dimers using a mercury cathode was most surprising in view of the results obtained by electrolysis of benzyl sulfonium salts as set forth in our above-identified copending U.S. applications.

Suitable sulfonium salts in the subject process are represented by II in which suitable inert R groups include halogens, such as a fluoro, chloro or bromo; hydroxy; nitro; or hydrocarbon groups, such as alkyl, aryl, aralkyl, alkaryl, alkenyl, cycloaliphatic, and the like, and halo- or hydroxy-substituted such hydrocarbon groups of from one to about 25 carbon atoms. The preferred sulfonium salts are those wherein (a) $n$ is an integer of from 0 to 2, or (b) $R_1$ and $R_2$ are alkyl or hydroxy-substituted alkyl of from 1 to about 4 carbon atoms; the most preferred sulfonium salts are those wherein $n$ is 0 or 1 (particularly the para-substituted reactants), R is alkyl or halo- or hydroxy-substituted alkyl, and $R_1$ and $R_2$ are alkyl or hydroxy-substituted alkyl of from one to about four carbon atoms. Representative examples of suitable sulfonium salts include those within II having the formula (III) 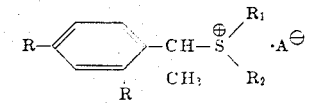

wherein:

TABLE I

| R | | | | |
|---|---|---|---|---|
| o-Substituent | p-Substituent | $R_1$ | $R_2$ | $A^-$ |
| F | H | $C_2H_5$ | $C_2H_5$ | Cl |
| Cl | H | $CH_3$ | $CH_3$ | Br |
| Cl | Cl | $n$-$C_4H_9OH$ | $n$-$C_4H_9$ | Cl |
| H | Br | $CH_3$ | $CH_3$ | Tosylate |
| H | H | $C_3H_7$ | $C_3H_7$ | F |
| H | OH | $n$-$C_8H_{17}$ | $n$-$CH_3$ | Cl |
| OH | OH | $CH_3$ | $CH_3$ | Br |
| H | COOH | $CH_3$ | $CH_3$ | Cl |
| $CH_3$ | OH | $n$-$C_6H_{13}$ | $n$-$C_6H_{13}$ | Tosylate |
| H | $NO_2$ | $n$-$C_{16}H_{26}OH$ | $n$-$C_{16}H_{26}OH$ | Br |
| H | $CH_3$ | $n$-$C_4H_9$ | $CH_3$ | $NO_3$ |
| $CH_3$ | $CH_3$ | $CH_3$ | $CH_3$ | Cl |
| H | iso-$C_3H_7$ | $n$-$C_3H_6OH$ | $n$-$C_3H_6OH$ | F |
| H | $n$-$C_6H_{13}$ | $n$-$C_6H_{13}$ | $n$-$C_6H_{13}$ | Tosylate |
| H | $n$-Decyl | $CH_3$ | $C_2H_5$ | $NO_3$ |
| H | $n$-Dodecyl | $n$-$C_4H_9$ | $n$-$C_4H_9$ | Cl |
| H | $n$-Octadecyl | $CH_3$ | $CH_3$ | Br |
| H | $C_6H_5$ | $n$-$C_{10}H_{21}$ | $n$-$C_{10}H_{21}$ | Tosylate |
| H | $(CH_3)_2C_6H_3$ | $CH_3$ | $CH_3$ | F |
| $C_2H_5$ | $(CH_3)_3C_6H_2$ | $C_2H_5$ | $C_2H_5$ | Cl |
| Cl | $C_6H_5$—$CH_2$ | $C_3H_7$ | $C_3H_7$ | Br |
| H | $CH_2$=$CH$— | $CH_3$ | $CH_3$ | Cl |
| H | $CH_2$=$CH$—$CH_2$ | $n$-$C_5H_{11}$ | $n$-$C_5H_{11}$ | Tosylate |
| H | $CH_2$=$CH$—$CH_2$— | $CH_3$ | $CH_3$ | Cl |
| H | Cyclohexyl | $C_2H_5$ | $C_2H_5$ | OH |
| $C_6H_{13}$ | $CCl_3$ | $CH_3$ | $CH_3$ | Br |
| H | $CCl_3$ | $n$-$C_{12}H_{25}$ | $n$-$C_{12}H_{25}$ | Tosylate |
| H | $CH_2Cl$ | $n$-$C_4H_9$ | $n$-$C_4H_9$ | Benzoate |
| H | $C_3F_7$ | $CH_3$ | $CH_3$ | F | and other compounds, such as pentafluoro-α-methylbenzyldiethylsulfonium chloride, m-nitro-α-methylbenzyldi-n-butylsulfonium nitrate, 3,5-dimethyl-α-methylbenzyldioctylsulfonium bromide, 3,5-dihydroxy-α-methylbenzyldiisobutylsulfonium fluoride, and the like.

The anion in II is typically an anion from a strong inorganic acid, such as a halide, nitrate, sulfate, etc., but may also be an organic anion, such as the tosylate anion, etc. The anion is advantageously selected so as to increase the solubility of the salt in the electrolysis solvent. E.g., the halides are advantageous when the solvent is water, and a tosylate anion is advantageous when an organic solvent is used.

Suitable electrolysis solvents in the subject process are those which either dissolve or substantially disperse the sulfonium salt and which are irreducible or not preferentially electrochemically reduced in the process. Suitable solvents are typically polar solvents which include water, dimethylformamide, hexamethyl phosphoramide, dioxane, acetonitrile, propionitrile, acetic acid, acetic acid-benzene mixtures, lower alkanols, such as methanol, ethanol, isopropanol and butanol; and the like, and mixtures of such solvents. Most sulfonium salts are readily soluble in water. Water, therefore, is generally the preferred solvent. However, in some instances, a solvent which dissolves the product is advantageous, such as acetic acid-benzene mixtures.

The concentration of the sulfonium salt in the electrolysis solvent can be varied from about $10^{-3}$ moles/liter to a saturated solution, but is typically selected at about 0.1 to 1 molar.

The process may be conducted in the presence of a supporting electrolyte, typically the alkali metal salt of a strong acid, such as KBr, KCl, $Na_2SO_4$, $NaNO_3$ and the like. When used, the supporting electrolyte is added in an amount from about 0.1 to 4 moles/liter. Since the sulfonium salts are good electrolytes, a supporting electrolyte is generally not required.

The cathode potential (reducing potential) may be maintained at a selected value or may be varied; the only requirement being that the cathode potential is sufficient to reduce the sulfonium salt. Typical cathode potentials are between about −0.5 and about −1.5 volts vs. a standard saturated calomel electrode. The former instance is referred to as controlled-potential electrolysis and is described by L. Meites in "Technique of Organic Chemistry," A. Weissberger-Editor, Vol. 1, 3rd. ed., page 3281, Interscience, N.Y. (1959). In the latter instance, the driving potential (electrical potential between the anode and cathode) is a direct voltage source, such as a battery, and is maintained constant while the cathode potential varies to some equilibrium value. The controlled-potential electrolysis system is presently preferred.

In either instance, the cathode is mercury and may suitably be either a stirred or unstirred pool of mercury or a dropping mercury electrode. A stirred pool or a dropping mercury cathode is preferred since the cathode surface is constantly being renewed.

It will be important to realize that the choice of cathode potential and reduction rate can influence the yield of the coupled product, e.g., α,α'-dimethylbibenzyl. Very negative cathode settings and low reduction rates favor the formation of ethylbenzene at the expense of α,α'-dimethylbibenzyl.

The method of controlled potential electrolysis as described by Meites is a convenient way to control the reducing potential at the cathode and by setting this cathode potential at the most positive values consistent with a reasonable reduction rate the yield of reductively coupled material can be maximized.

Preferably, the electrolyte solution is stirred throughout the process to facilitate movement of the sulfonium ions into the reduction zone.

The pH of the electrolyte solution and the temperature are not critical and may be any value so long as the sulfonium cation is not degraded by the pH or temperature. Typically, however, the pH is conveniently selected between about 3 and about 9, and the temperature is between about 20° C. and about 80° C. The higher temperatures increase the reaction rate and allow the reduction to proceed at more positive potentials.

The subject process may be conducted as (a) a batch process or (b) a continuous process wherein the supply of sulfonium salt is continuously renewed by adding more sulfonium salt per se or by adding an α-methylbenzyl halide which reacts with the sulfide byproduct to form the sulfonium salt in situ, or by recycling the reaction mixture after the product is removed, etc.

The product may be recovered from the reaction mixture by any known convenient method, e.g., by solvent extraction or filtration.

SPECIFIC EMBODIMENTS

The following examples further illustrate the invention.

EXAMPLE 1

Preparation of 2,3-Diphenylbutane by Controlled-Potential Electrolysis

A three-compartment glass electrolysis cell as described by L. Meites (see above reference) was used. The cathode compartment contained 100 ml. of mercury as the cathode, a magnetic stirring bar, 170 ml. of 0.3N tetraethylammonium nitrate (TEAN) in dimethylformamide (DMF) and 0.0118 moles of α-methylbenzyldimethylsulfonium tosylate (white crystals — m.p. 110°-113° C.) and was continuously flushed with nitrogen. The central and anode compartments contained 0.5N TEAN in DMF. The anode was a graphite rod. The cathode potential was maintained at −1.0 volts vs. a standard saturated calomel electrode. The process was conducted at room temperature. The current ranged from 70 milliamperes (ma.) initially to zero over a period of 11.5 hours. The product was recovered by removing the liquid catholyte (DMF) under reduced pressure, washing the resulting solids with water to remove the TEAN and recrystallizing the remaining solid in benzene. The white product was identified by infrared and mass spectroscopy; yield = 64%.

EXAMPLE 2

Preparation of 2,3-Diphenylbutane by Uncontrolled Cathode Potential

The electrolysis was conducted in a beaker electrolysis cell. A mercury pool was the cathode and a graphite rod was the anode. Enough 0.2N α-methylbenzyldimethylsulfonium chloride in water was added to cover the electrodes and an electrical potential (driving voltage) of about 3 volts applied; current was 50 ma. A hydrophobic white solid formed at the mercury surface. It was removed and identified as 2,3-diphenylbutane by mass spectroscopy.

Similar results are obtained by using substituted α-methylbenzylsulfonium salts as identified above.

We claim:

1. An electrolytic process for preparing compounds having the formula

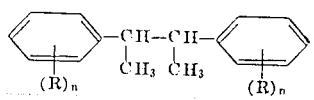

wherein R is an inert substantially non-interferring halo, hydroxy, nitro or hydrocarbon group or a halo- or hydroxy-substituted hydrocarbon group of from 1 to 25 carbon atoms and n is an integer of from 0 to 5, said process comprising subjecting an α-methylbenzyl sulfonium salt in solution in an electrolysis solvent to an electrical potential sufficient to reduce said sulfonium salt at a mercury cathode; said sulfonium salt having the formula

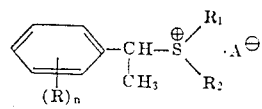

wherein R has the aforesaid meaning, and $R_1$ and $R_2$ are alkyl or hydroxy-substituted alkyl groups of from one to 15 carbon atoms.

2. The process defined in claim 1 wherein $R_1$ and $R_2$ are alkyl or hydroxy-substituted alkyl groups of from one to four carbon atoms.

3. The process defined in claim 1 wherein $n$ is an integer of from 0 to 2.

4. The process defined in claim 3 wherein $n$ is 0 or 1 and R is alkyl or a halo- or hydroxy-substituted alkyl.

5. The process defined in claim 1 wherein said electrolysis solvent is water.

6. The process defined in claim 1 wherein the cathode potential is maintained at a substantially constant value.

7. The process defined by claim 4 wherein $R_1$ and $R_2$ are each alkyl or hydroxy-substituted alkyl groups of from one to four carbon atoms.

8. The process defined by claim 7 wherein $n$ is 0.

9. The process defined in claim 1 wherein R is a halo, hydroxy or hydrocarbon group or a halo- or hydroxy-substituted hydrocarbon group.

10. The process defined in claim 1 wherein the desired product is recovered.

* * * * *